(No Model.) 3 Sheets—Sheet 3.
L. HAMMER.
HARVESTER.
No. 588,862. Patented Aug. 24, 1897.
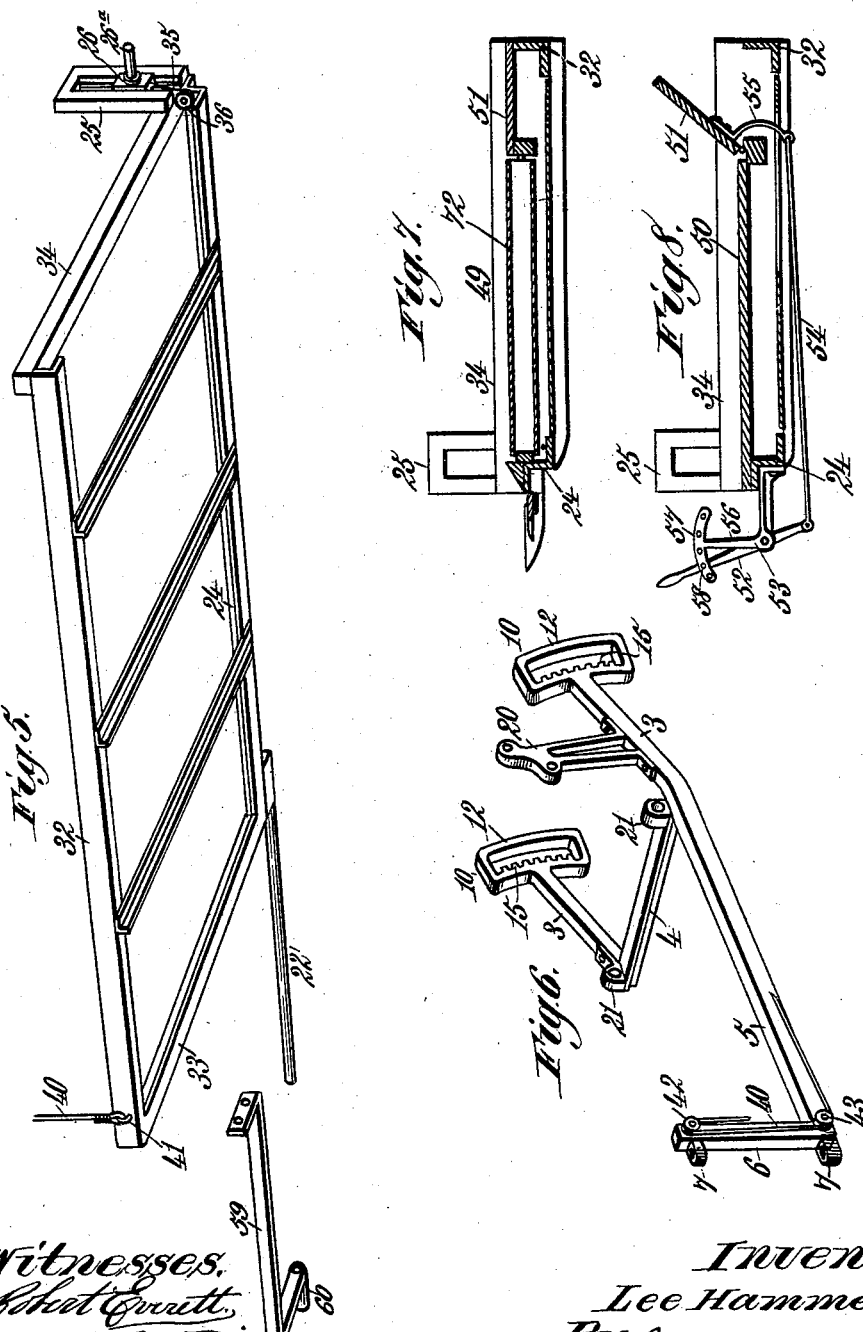
Witnesses.
Robert Everitt
Albert H. Norris
Inventor.
Lee Hammer,
By James L. Norris.
Atty.

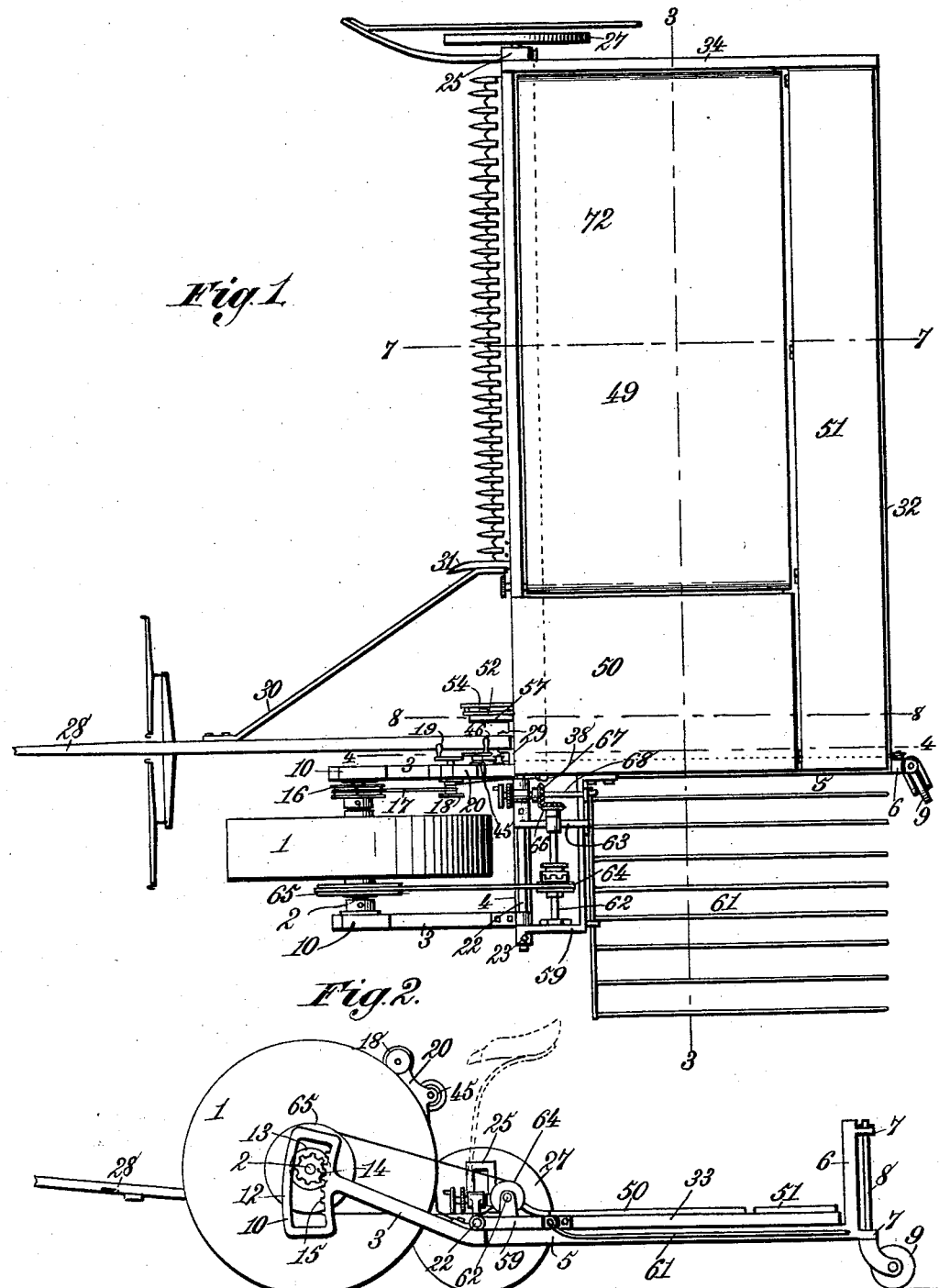

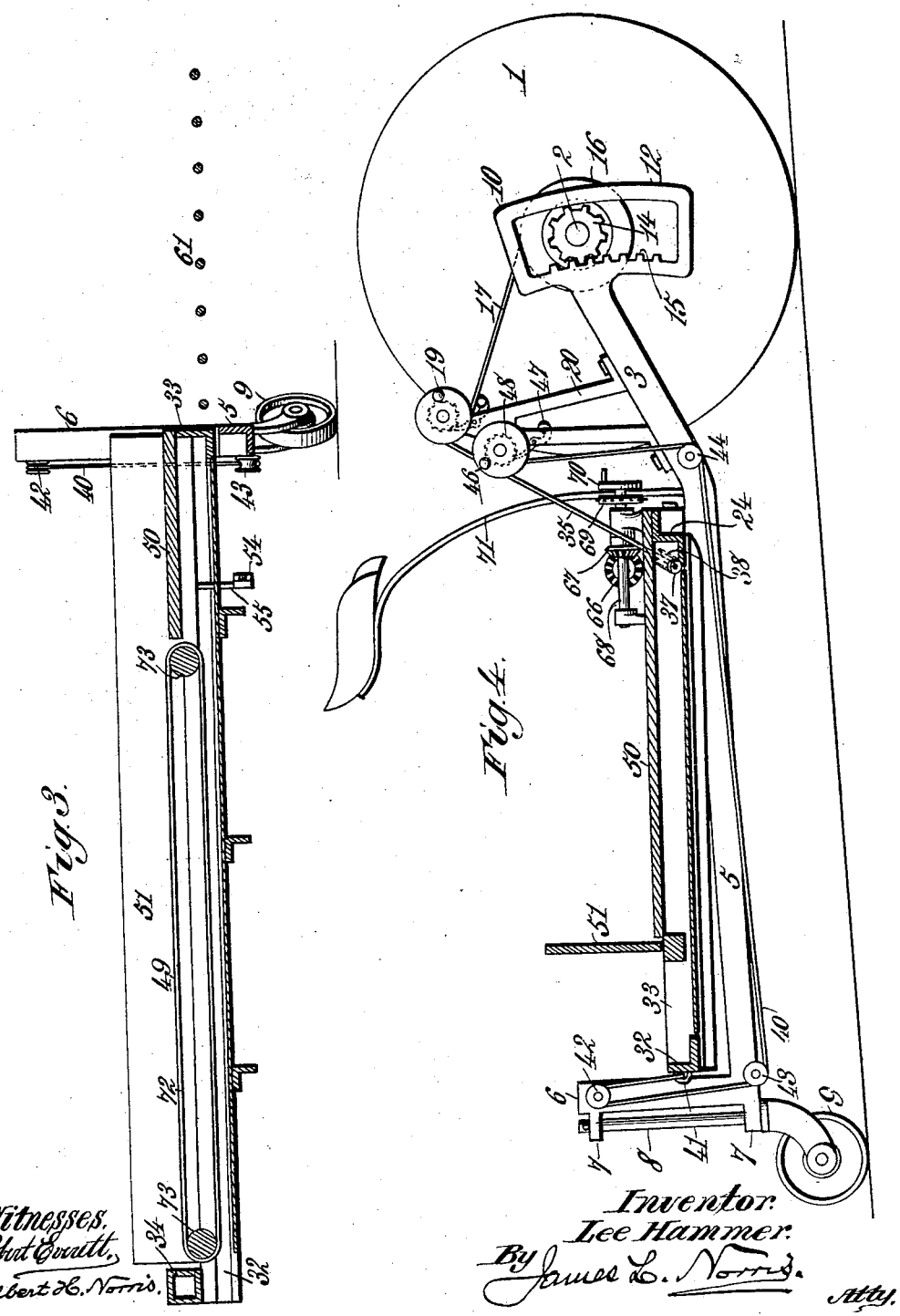

UNITED STATES PATENT OFFICE.

LEE HAMMER, OF BRIDGEWATER, VIRGINIA.

HARVESTER.

SPECIFICATION forming part of Letters Patent No. 588,862, dated August 24, 1897.

Application filed July 20, 1896. Serial No. 599,919. (No model.)

*To all whom it may concern:*

Be it known that I, LEE HAMMER, a citizen of the United States, residing at Bridgewater, in the county of Rockingham and State of Virginia, have invented new and useful Improvements in Harvesters, of which the following is a specification.

My invention relates to harvesting-machines, my object being to simplify and improve the construction, arrangement, and operation of harvester-binders, to decrease the number of mechanical parts, to bring the operative parts within easy reach of the driver and enable him to control the mechanism by their means without distracting attention from the team or interfering with its proper management, and to enable the harvester to be operated with less expenditure of power.

The invention consists in the novel features of construction and in the parts and new combinations of parts hereinafter fully explained and then particularly pointed out and defined in the claims which conclude this specification.

For the purposes of the following description reference will be had to the accompanying drawings, in which—

Figure 1 is a plan view of a harvester in which my invention is incorporated, the packing and knotting mechanism being omitted, as these constitute no part of my improvements, in connection with which I may use any known form of these mechanisms. Fig. 2 is an elevation of the harvester, taken upon the drive-wheel or ground-wheel side. Fig. 3 is a vertical section taken upon the line 3 3 in Fig. 1. Fig. 4 is a vertical section on the line 4 4, Fig. 1. Fig. 5 is a perspective view of the platform, looking toward the under side, together with the Z-bracket, which supports the bundle-carrier and part of the gearing, said bracket being detached. Fig. 6 is a perspective view of the lift by which the cutter-bar is adjusted in height and showing part of the mechanism for adjusting the position of the platform. Fig. 7 is a transverse vertical section of the platform, taken on the line 7 7, Fig. 1; and Fig. 8 is a like section on the line 8 8 in said Fig. 1.

The reference-numeral 1 in said drawings indicates the drive-wheel or ground-wheel of the harvester, having a shaft 2, upon the end of which are supported the parallel bars 3 of the machine-frame. These bars extend toward the rear with a small inclination downward and at their lowest point they are united rigidly by a bar 4. One of the bars 3 is prolonged to form a supporting-bar 5, terminating at its rearward end in a standard or post 6, which may be an integral part of the bar. At the point where the latter unites with the bar 3 it makes a small angle with it, so that normally the bar 5 will lie horizontally, except as it is adjusted in the manner hereinafter explained. The post 6 is provided with brackets or lugs 7 upon its rearward face, in which a spindle 8 is swiveled, the lower end of said spindle being provided with a caster-wheel 9. At their forward extremities the arms 3 have integral loops or open frames 10, which are curved slightly in the arc of a circle struck from the rear end of the bar 5 or thereabout. When said bar is horizontal, the two longer members 12 of each frame are substantially vertical and lie upon opposite sides of the axle or shaft 2. Upon this shaft on each side of the drive-wheel 1, which is loose upon the shaft 2, is rigidly mounted a heavy collar 13, having a pinion 14 formed on or rigidly attached to it. These pinions lie in the loops or frames 10 and mesh with racks of teeth 15, formed upon the rearward members of said frames. The pinions are operated to raise and lower the loops and thereby vary the position or inclination of the supporting-bar 5 by means of a pulley 16 upon one of the collars 13, which is actuated by a wire cable, belt, or sprocket-chain 17, winding upon and unwinding from a drum 18 of small diameter as compared with the pulley 16. The drum 18 is revolved by any suitable means, such, for example, as a crank 19. The shaft of the drums is supported by an upright bracket 20, bolted to the right-hand bar 3, so that it is readily accessible to the driver.

The loops or open frames 10 are of such widths within as to receive the pinions 14 and permit them to turn readily, but allowing no lost motion, the forward members 12 of said loops retaining the pinions in mesh with the teeth 15 and preserving the proper relations between the drive-wheel and the frame.

At or near the ends of the bar 4 are lugs 21, which give a pivotal or hinge support to a spindle 22, which is held in the lugs by a cotter-pin 23 or other suitable means. The spindle projects from the end of a sill 24, which forms the support for the forward edge of the grain-platform. At the opposite end of this sill is a vertical frame 25, in which a block 26 may have adjustment. This block carries a stud or journal 26ª for a grain-wheel 27. The tongue 28 is secured between lugs 29, projecting from the sill near the right-hand bar 3, and it may be stiffened by a lateral brace 30, the end of which is bolted to the bracket or shoe 31 at the end of the cutter-bar, which is also supported on the forward face of the sill 24.

The grain-platform is rectangular and has a perfectly flat plane surface from end to end. The front sill 24 of said platform is preferably a double angle-bar or Z-bar, which gives great strength and rigidity, with comparatively little weight, and its forward angle provides a convenient seat for the square end of the spindle 22 and the cutter-bar.

The rear edge of the platform is supported by an angle-bar 32 and its ends by beam 33. The end next the grain-wheel is usually provided with a second transverse hollow beam 34, in order to provide a secure attachment for the frame 25. A wire cable 35 is attached at one end to the block, thence carried straight downward over a guide-pulley 36, and then beneath and parallel with the front of the platform to the other end of the same, where it passes through an opening 37 in the angle-bar to a guide-pulley 38 and up to the drum 18, upon which the cable or belt 17 winds. The rotation of this drum, therefore, raises or lowers the front of the platform and varies the height at which the cutter operates, so that long or short stubble may be cut of any length desired. In this adjustment the bar 5, which supports one end of the platform, moves up and down with its forward edge.

The platform has another adjustment wholly independent of that described, in which it turns upon the spindle 22 and journal 26 as an axis, its rearward edge being raised and lowered to preserve its horizontal position when the reaper is passing over inclined ground—as, for example, such as is indicated in Fig. 4 of the drawings. This adjustment is effected by means of a cable 40, having its end secured in an eye 41 upon the rear of the platform beside the post 6. It extends upward over a pulley 42 upon the post near its top, then down and under a pulley 43 upon the side of the bar 5 near its rearward end. Thence it is carried beneath the platform and under a second pulley 44 on the same bar at or near the point where it unites with the bar 3. It is thence carried up to a drum 45, near the top of the bracket 20. This drum is operated by any preferred means, such as a crank 46, and is held at the required adjustment by a pawl 47, pivoted on the bracket, and a ratchet 48 on the drum-shaft. By this adjustment the level of the platform can be always preserved without affecting the height at which the cutter acts, since the latter, being carried by the front of the platform, is in or nearly in the pivotal axis upon which the platform turns in making the adjustment.

The surface of the platform is divided into three parts, as shown in Fig. 1, the main portion 49 being directly in rear of the cutter, where it receives the grain as the latter falls. At the end adjacent to the driver's seat and beyond the corresponding end of the cutter-bar is a portion 50, lying in the same plane with the main portion 49, to carry the packing or bundling and knotting mechanisms, which are not shown in this case, as they are well known and form no part of my present invention. The rearward portion of the surface consists of a comparatively narrow space 51, extending from end to end. It is formed of a board or strip of any suitable material, which is hinged at one edge to the edges of the surfaces 49 and 50. Under perfectly normal conditions this strip lies flat in the same plane with the other parts of the platform; but in case a wind should arise high enough to disturb the grain lying on the platform it may be raised or turned to stand at any desired angle with the parts to which it is hinged. This adjustment is effected by a lever 52, fulcrumed upon a bracket 53, which projects from the front of the platform close to the pole. The lower end of said lever is connected pivotally to one end of a rod 54, which extends beneath the platform toward the rear, its other end being pivotally connected to the end of a curved arm 55, which is rigidly secured at its other end to the lower face of the strip 51. Upon the bracket 53 is a post 56, carrying a curved bar 57, beside which the lever moves, a pin or tooth on the latter engaging with openings 58 to hold the strip 51 at any angle desired, as seen in Fig. 8.

Upon the end of the platform nearest the seat is bolted one end of a Z-bracket 59, its other end having an eye 60, which is slipped upon the end of the spindle 22, the cotter-pin 23 being passed through both. Upon the long arm of this bracket is mounted the bundle-carrier 61, which lies close to the part 50 of the platform, on which the grain is bundled and tied.

One end of the bracket also furnishes support for a counter-shaft 62, which also has a bearing upon a bar 63, carried by the bar 4 and the long arm of the bracket 59. This shaft has a pulley or sprocket 64, driven by a similar gear 65 on the shaft 2. Its motion is communicated through bevel-gears 66 and 67 to a shaft 68, which carries a disk 69 and wristpin 70, to reciprocate the cutter-bar. The seat-support 71 is usually bolted to the bar 4, so that the driver can easily reach the several parts under his control without taking his attention from the team.

By the arrangement of parts described nearly all the mechanism is brought in rear of the drive-wheel 1 and is supported at three points, two of which, the grain-wheel and caster-wheel, are in rear of the third point, which is the shaft of the drive-wheel. The only weight therefore upon the horses is the tongue, and they are relieved of the heavy load which they have to sustain when the harvester is carried by a drive-wheel and grain-wheel only. In turning, also, the drive-wheel may be the pivot, and the machine will turn with the greatest ease in either direction.

The platform is provided with a grain-carrying apron 72, of any suitable material, carried by rolls 73, located at the ends of the main portion 49, as shown in Fig. 3. This apron brings the grain to the binding and knotting section 50 of the platform with great uniformity, rakes and elevating mechanism being entirely dispensed with.

What I claim is—

1. In a harvester-binder, the combination with a drive-wheel, of rearwardly and downwardly inclined parallel bars between which the drive-wheel turns, open frames on the ends of said bars having teeth on the inner edge of one of the parts of each frame, pinions lying in said frame, meshing with the teeth and carried by an axle loose in the drive-wheel, a grain-platform having pivotal support upon the parallel bars, in line with its forward edge, a grain-wheel connected to said platform in the same line, a caster-wheel at the rearward edge and stubble end of the platform and carried by the drive-wheel frame, means for operating the pinions to raise or lower the front of the platform, together with the parallel bars and frame, and independent devices for raising and lowering the rear of said platform, its forward edge turning upon the pivotal bearing, substantially as described.

2. In a harvester-binder the combination with a frame having two forwardly-projecting parallel bars at the stubble end, a driving-wheel arranged between said bars, pinions upon both ends of a loose axle in said driving-wheel, said pinions lying in open frames on the ends of the parallel bars and meshing with teeth on the rearward members of said frames, means for operating said pinions to raise and lower the front edge of the platform and the frame, including the parallel bars, a caster-wheel at the rear edge and stubble end of the platform and carried by the drive-wheel frame, a grain-wheel at the forward edge and grain end of said platform, a block vertically movable in a frame on the platform and having a projecting bearing for the grain-wheel, a cord and pulleys to raise and lower the platform, the vertical frame thereon sliding on the block, a cord carried over a pulley on a vertical post near the caster-wheel and attached to the rear of the platform to raise and lower the same independently, and means for operating said cords, substantially as described.

3. In a harvester-binder, the combination with a platform having a spindle upon its stubble end and forward edge, of a supporting-frame on which said spindle has pivotal bearing, a grain-wheel at the forward angle of the platform, a block having a bearing for said wheel and vertically adjustable in a vertical frame on the platform, a cord carried beneath a pulley on the end of the platform and then upward to the block, means for taking up, and paying off said cord, a caster-wheel at the rearward edge and stubble end, having pivotal bearing in lugs on a vertical post forming part of the harvester-frame, a cord and pulleys for adjusting the height of the rear edge of the platform upon said post, and independent means for raising and lowering the forward edge of the same, to vary the length of stubble, substantially as described.

4. In a harvester-binder the combination with a frame having parallel bars of a drive-wheel between said bars, its loose axle lying in open frames upon their ends, pinions upon said axle meshing with racks on said frames, means for driving said pinions in either direction, a grain-wheel having its bearing upon a block which is vertically adjustable in a frame at the forward angle of the grain-platform, a caster-wheel at the stubble end and rearward edge of said platform carried by the wheel-frame, independent operating devices, one connected by a cord to the adjustable support for the grain-wheel journal and the other connected to the rear of the platform by a cord carried over a pulley on a post rising from the frame near the caster-wheel and attached to the platform at or near its rearward angle, substantially as described.

5. In a harvester-binder, the combination with a drive-wheel and shaft of a frame having two bars supported at their ends on the ends of the shaft, a platform supported at one end by a prolongation of one of said bars, at the other end by a grain-wheel, and in rear by a caster-wheel having a swivel bearing upon a post on the prolonged bar, a drum and means for rotating the same in either direction located within reach of the driver, and means operated by said drum to raise and lower the forward part of the platform and the cutter mounted thereon to vary the length of stubble, substantially as described.

6. In a harvester-binder, the combination with a drive-wheel and a shaft loose therein, of parallel bars having loops or frames inclosing the ends of the shaft, rigid collars on said shaft having pinions meshed with teeth on the loops, a pulley on one of said collars, a platform supported at one end by a prolongation of one of the parallel bars, and by a caster-wheel at the rear end of the prolongation, a grain-wheel having a journal upon a block arranged in a vertical guideway on the grain end and forward edge of the platform, and means within reach of the driver for simultaneously raising and lowering the forward portion of the platform at both ends, substantially as described.

In testimony whereof I have hereunto set my hand in presence of two subscribing witnesses.

LEE HAMMER.

Witnesses:
CHAS. B. TILDEN,
HOWARD M. NORRIS.